C. CASPERSON.
FRUIT PICKER.
APPLICATION FILED JULY 22, 1920.
1,363,456.
Patented Dec. 28, 1920.
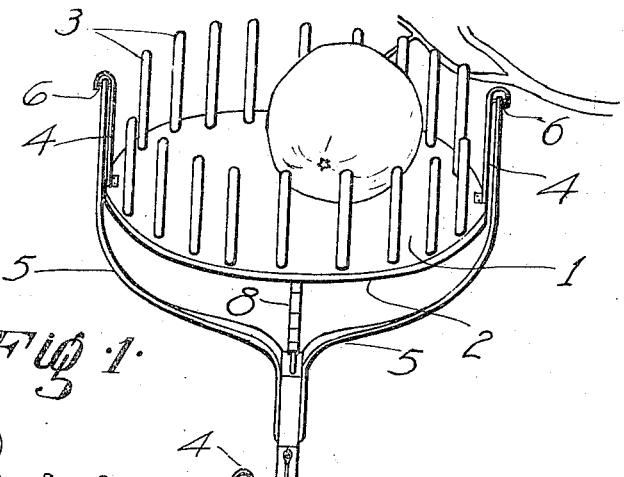
Fig. 1.
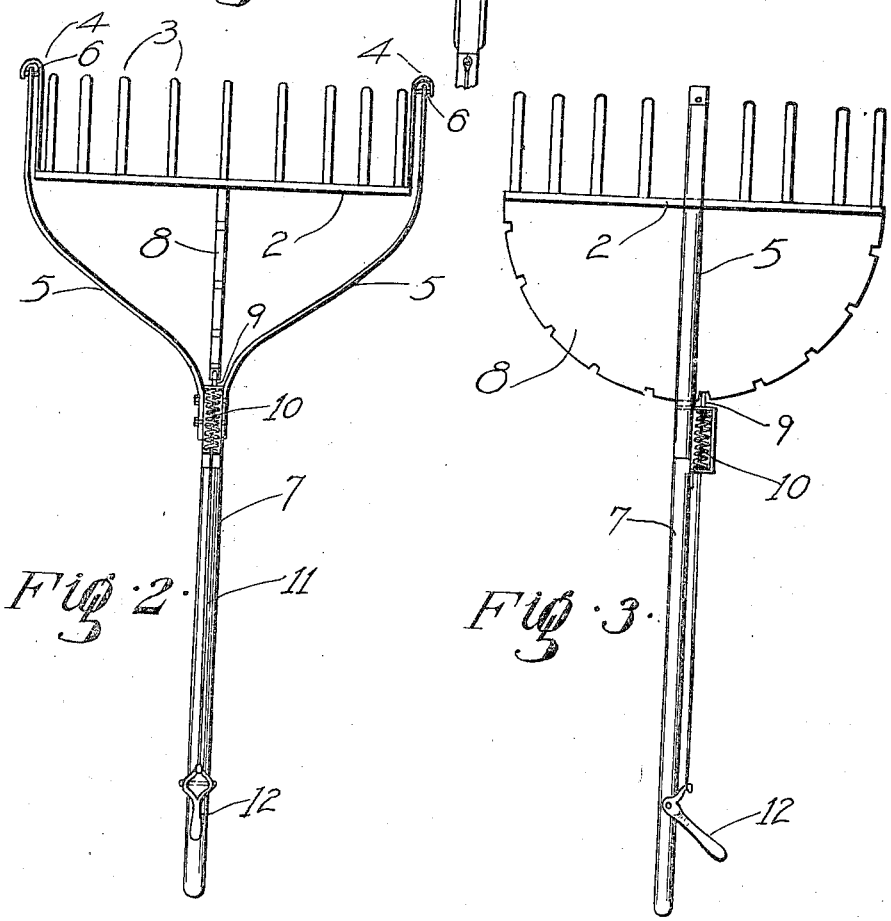
Fig. 2.
Fig. 3.
INVENTOR
Carl Casperson
BY
Adam E. Fisher
ATTORNEY

UNITED STATES PATENT OFFICE.

CARL CASPERSON, OF WALCOTT, NORTH DAKOTA.

FRUIT-PICKER.

1,363,456.

Specification of Letters Patent.  Patented Dec. 28, 1920.

Application filed July 22, 1920. Serial No. 398,185.

*To all whom it may concern:*

Be it known that I, CARL CASPERSON, a citizen of the United States, residing in the city of Walcott and State of North Dakota, have invented new and useful Improvements in Fruit-Pickers, of which the following is a specification, reference being had to the accompanying drawings.

This invention is in the nature of a fruit gatherer or picker, for gathering apples, pears, peaches and the like from the trees.

The purpose is to provide a simple, efficient and durable device of this nature for picking fruit from otherwise inaccessible limbs.

In the drawings:

Figure 1 is a perspective view showing the apparatus in use.

Fig. 2, a front elevation.

Fig. 3, a side elevation.

The invention consists of a fruit tray 1, made up of a circular base 2, lined around its edge with vertical and spaced pins 3. This tray is pivotally suspended by means of two oppositely disposed straps 4 which are attached to the tray, to a fork 5, by means of pivot pins 6. The fork 5 is in turn mounted at the end of a handle 7. A segmental rack 8 is mounted on the lower side of the tray 1, perpendicularly through the fork 5, and a pawl 9 controlled by the spring 10 is mounted on the handle 7 so as to engage the rack 8. A rod 11 is attached to the pawl 9 and extends down to the reach of the operator, ending in a grip 12.

In operation, the tray is raised under the fruit and is pulled off the bough by means of the pins 3, the fruit falling in the tray 1. The weight of the rack 8 tends to hold the tray 1 constantly horizontal. The pawl 9 affords means for locking the tray 1 at any degree of inclination relative to the handle 7.

While I have herein described a certain specific method of constructing and assembling the elements of my invention, it is understood same may be varied in minor details, not departing from the spirit of my invention as defined in the appended claim.

What I claim to be new and patentable is:

A fruit picker comprising a handle; a fork at the upper end of the handle; a tray pivotally suspended between the fork; spaced pins vertically mounted around the edge of the tray; a segmental rack mounted on the lower side of the tray perpendicularly through the fork; a spring actuated pawl to engage said rack; and a rod extended from the pawl to the hand of the operator.

CARL CASPERSON.

Witnesses:
 Q. M. FASSUN,
 C. C. CASPERSON.